United States Patent
Somasundaram et al.

(10) Patent No.: US 9,258,087 B2
(45) Date of Patent: *Feb. 9, 2016

(54) METHOD AND APPARATUS FOR HYBRID AUTOMATIC REPEAT REQUEST TRANSMISSION

(71) Applicant: InterDigital Technology Corporation, Wilmington (DE)

(72) Inventors: Shankar Somasundaram, Mountain View, CA (US); Mohammed Sammour, Amman (JO); Ana Lucia Iacono, Phoenixville, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/668,862

(22) Filed: Nov. 5, 2012

(65) Prior Publication Data

US 2013/0067293 A1    Mar. 14, 2013

Related U.S. Application Data

(63) Continuation of application No. 11/968,979, filed on Jan. 3, 2008, now Pat. No. 8,332,702.

(60) Provisional application No. 60/883,470, filed on Jan. 4, 2007.

(51) Int. Cl.
    *H04L 1/18*    (2006.01)

(52) U.S. Cl.
    CPC ............... *H04L 1/1887* (2013.01); *H04L 1/188* (2013.01); *H04L 1/1822* (2013.01); *H04L 1/1877* (2013.01)

(58) Field of Classification Search
    CPC ... H04L 1/1822; H04L 1/1877; H04L 1/1887; H04L 1/188; H04L 1/1809; H04L 1/1848; H04L 1/1812; H04L 1/0003; H04L 1/1819; H04L 1/1816
    USPC .................................. 714/748, 704, 794, 799
    See application file for complete search history.

(56) References Cited

U.S. PATENT DOCUMENTS 5,745,502 A * 4/1998 Khayrallah et al. .......... 714/751
5,881,247 A * 3/1999 Dombrosky et al. ......... 710/100

(Continued)

FOREIGN PATENT DOCUMENTS

| EP | 1 398 897 A2 | 3/2004 |
|---|---|---|
| EP | 1 643 794 A1 | 4/2006 |
| WO | WO-2004/042993 A1 | 5/2004 |
| WO | WO 2005/064839 | 7/2005 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300 V8.3.0, Dec. 2007, 121 pages.

(Continued)

*Primary Examiner* — James C Kerveros
(74) *Attorney, Agent, or Firm* — Eric Berkowitz

(57) ABSTRACT

A method and apparatus for hybrid automatic repeat request (HARQ) transmission are disclosed. If a packet has not been successfully transmitted, it is determined whether an HARQ early termination condition is met. If the HARQ early termination condition is met, the HARQ process is terminated and the packet is discarded at the HARQ level. The HARQ early termination condition is met if a positive acknowledgement (ACK) has not been received until the number of retransmissions reaches a predetermined limit that is dynamically configured based on channel condition, measurement, etc. Alternatively, the HARQ early termination condition is met if a transmit power required for successful transmission of the packet is much higher than an actual transmit power. Alternatively, the HARQ early termination condition is met if a transport format combination (TFC) selected for retransmission is different from an optimal TFC. A higher layer may be notified of the early HARQ termination.

20 Claims, 1 Drawing Sheet

(56) References Cited

U.S. PATENT DOCUMENTS

| | | | |
|---|---|---|---|
| 6,542,718 B1* | 4/2003 | Kuo et al. | 455/69 |
| 6,587,985 B1* | 7/2003 | Fukushima et al. | 714/748 |
| 6,662,330 B1* | 12/2003 | Hershey | 714/748 |
| 7,024,611 B2* | 4/2006 | Chen et al. | 714/748 |
| 7,159,162 B2* | 1/2007 | Ludwig et al. | 714/748 |
| 7,188,293 B2* | 3/2007 | Park | 714/748 |
| 7,369,549 B2* | 5/2008 | Wu et al. | 370/389 |
| 7,477,622 B2* | 1/2009 | Attar et al. | 370/329 |
| 7,525,908 B2* | 4/2009 | Olsson et al. | 370/229 |
| 7,564,819 B2* | 7/2009 | Khan | 370/335 |
| 7,573,820 B2* | 8/2009 | Krishnaswamy et al. | 370/235 |
| 7,573,852 B2* | 8/2009 | Kim et al. | 370/335 |
| 7,636,328 B2* | 12/2009 | Teague et al. | 370/277 |
| 7,668,102 B2* | 2/2010 | Li et al. | 370/236 |
| 7,684,329 B2* | 3/2010 | Mohanty et al. | 370/232 |
| 7,719,991 B2* | 5/2010 | Bhushan et al. | 370/252 |
| 7,764,661 B2* | 7/2010 | Heo et al. | 370/342 |
| 7,788,566 B2* | 8/2010 | Vitebsky et al. | 714/748 |
| 7,852,803 B2* | 12/2010 | Kim | 370/328 |
| 7,986,676 B2* | 7/2011 | Waxman | 370/338 |
| 8,050,247 B2* | 11/2011 | Kim et al. | 370/349 |
| 2003/0206524 A1 | 11/2003 | Mohanty et al. | |
| 2005/0201378 A1* | 9/2005 | Ludwig | H04L 1/1809 370/395.1 |
| 2005/0251722 A1 | 11/2005 | Terry et al. | |
| 2006/0007880 A1 | 1/2006 | Terry | |
| 2006/0013216 A1 | 1/2006 | Rajkotia et al. | |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300 V0.3.1, Nov. 2011, 64 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; State 2 (Release 8)", 3GPP TS 36.300 V0.2.0, Nov. 2006, 65 pages.

"3rd Generation Partnership Project; Technical Specification Group Radio Access Network; Evolved Universal Terrestrial Radio Access (E-UTRA); Medium Access Control (MAC) protocol specification (Release 8)", 3GPP TS 36.321 V8.0.0, Dec. 2007, 23 pages.

"3rd Generation Partnership Project; Technical Specification Group Radio Access Network; Medium Access Control (MAC) Protocol Specification (Release 7)", 3GPP TS 25.321 V7.3.0, Dec. 2006, 113 pages.

"3rd Generation Partnership Project; Technical Specification Group Radio Access Network; Evolved Universal Terrestrial Radio Access (E-UTRA) Radio Resource Control (RRC); Protocol specification (Release 8)", 3GPP TS 36.331 V8.0.0, Dec. 2007, 56 pages.

"United States Final Office Action", dated May 30, 2012, U.S. Appl. No. 11/968,979, 13 pages.

"United States Non-Final Office Action", dated Nov. 2, 2011, U.S. Appl. No. 11/968,979, 11 pages.

"United States Non-Final Office Action", dated Feb. 16, 2012, U.S. Appl. No. 11/968,979, 9 pages.

"Taiwan Office Action", Taiwan Application No. 097100254, Sep. 25, 2013, 7 pages.

"Taiwan Office Action (English Translation)", Taiwan Application No. 097100254, Sep. 25, 2013, 5 pages.

* cited by examiner

METHOD AND APPARATUS FOR HYBRID AUTOMATIC REPEAT REQUEST TRANSMISSION

CROSS REFERENCE TO RELATED APPLICATION

This application is a Continuation of U.S. application Ser. No. 11/968,979, filed Jan. 3, 2008 (now issued as U.S. Pat. No. 8,332,702) and claims the benefit of U.S. provisional application No. 60/883,470 filed Jan. 4, 2007, each of which is incorporated by reference as if fully set forth.

FIELD OF INVENTION

The present invention is related to wireless communication.

BACKGROUND

Automatic repeat request (ARQ) is a transmission scheme that a receiver sends feedback to a transmitter informing that a data block has been decoded successfully or not, and a failed data block is retransmitted by the transmitter based on the feedback. Hybrid ARQ (HARQ) is a variance of the ARQ. In HARQ, the previously failed data block is stored in the receiver and combined with a retransmitted data block.

There are two types of HARQ schemes: chase combining and incremental redundancy. In chase combining, when the receiver detects an error in the received data block, a retransmission is requested and the incorrectly decoded data block is stored and combined with the retransmitted data block. In incremental redundancy, the retransmitted data block is coded differently from the previous failed data block, rather than simply repeating transmission of the same data block as in chase combining. Incremental redundancy gives better performance since coding and modulation are effectively performed across retransmissions. Chase combining may be considered a type of incremental redundancy.

HARQ may be used in a stop-and-wait mode or in a selective repeat mode. In the stop-and-wait mode, one data block is transmitted at a time. After each data block is transmitted, the transmitter waits until feedback, (i.e., positive acknowledgement (ACK) or negative acknowledgement (NACK)), is received. A new data block is transmitted, (or the previous data block is retransmitted), only after the feedback is received or if a timer expires. In the selective repeat mode, the HARQ process continues to send a number of data blocks specified by a window size, regardless of the feedback (ACK or NACK). The receiver keeps track of the sequence numbers of the data blocks received and informs the transmitter in the feedback. Once the transmitter has sent all the data blocks in the window, the transmitter re-sends failed data blocks indicated via a feedback channel.

In a simple stop-and-wait mode, the transmitter has to wait for the receiver's acknowledgement and this reduces system efficiency. Therefore, multiple stop-and-wait HARQ processes are usually used in parallel, wherein one HARQ process is waiting for an acknowledgement, another HARQ process may use the channel to send data.

A universal mobile telecommunication system (UMTS), (such as high speed downlink packet access (HSDPA) and high speed uplink packet access (HSUPA)), uses HARQ with chase combining or incremental redundancy with multiple stop- and wait HARQ processes in parallel. For example, for HSUPA enhanced dedicated channel (E-DCH) transmissions, a medium access control (MAC) layer in a user equipment (UE) performs E-DCH transport format combination (E-TFC) selection and delivers a transport block to the HARQ process, which handles transmission and retransmission of the transport block. For HSUPA, for the E-TFC selection, the MAC layer takes into consideration the maximum allowed puncturing, the maximum allowed UE transmit power, and the serving grant for the E-DCH, (i.e., how much power is allowed to be used by the E-DCH). However, for retransmission of a failed transport block, the same E-TFC is used, which implies that the same transport block size is used.

This causes several problems. First, the level of puncturing may be different for retransmissions in case the compressed mode used in the given frame is different. This may lead to higher puncturing, which may cause the UE to exceed its allowed puncturing, (i.e., the puncturing limit). Second, the power used by the E-DCH dedicated physical data channel (E-DPDCH) depends not only on the block size but also on the compressed mode used in the frame. The transmit power is recalculated for each retransmission, (i.e., beta factors for E-DCH are adjusted for every retransmission based on compressed mode). If the transmit power required for the retransmission is higher than the initial transmission power, the UE may exceed its maximum allowed transmit power, in which case the power is clipped to the maximum allowed power. This will result in an increase of the probability of error in the data block and consequently in an increase of the probability that the transmission will fail. The UE may also exceed its E-DCH serving grant. This will result in an increase of interference in the cell, which may affect the overall system capacity.

In a system where adaptive modulation and coding (AMC) is used, (such as 3GPP long term evolution (LTE) system), for a particular allocation of radio resources, a less robust modulation and coding scheme (MCS) allows for larger transport block sizes and a more robust MCS requires smaller transport block sizes. As a result, since the transport block size is fixed for every retransmission, the transmitter may not be able to change the MCS between retransmissions.

For LTE, it has been proposed to re-segment radio link control (RLC) protocol data units (PDUs) or RLC service data units (SDUs) if a transport block containing the RLC PDU or SDU is not transmitted successfully. However, it is proposed to be done after the HARQ process has already tried to transmit the transport block, (i.e., after all HARQ level retransmissions allowed in the specific HARQ process take place). The PDU or SDU re-segmentation is not performed at an HARQ level, but at an RLC level, which means every HARQ level retransmission is performed using the same transport block size. Therefore, the LTE system would suffer from similar problems described above.

SUMMARY

A method and apparatus for HARQ transmission are disclosed. If a packet has not been successfully transmitted, it is determined whether an HARQ early termination condition is met. If the HARQ early termination condition is met, the HARQ process is terminated and the packet is discarded at the HARQ level. The HARQ early termination condition is met if an ACK has not been received by the time the number of retransmissions of the packet reaches a predetermined limit, (that may be dynamically configured based on channel condition, measurement, etc.). Alternatively, the HARQ early termination condition is met if a transmit power required for successful transmission of the packet is much higher than an actual transmit power. Alternatively, the HARQ early termination condition is met if a transport format combination (TFC) selected for retransmission is different from, (e.g., smaller than), an optimal TFC. A higher layer may be notified of the early HARQ termination, and the packet may be retransmitted or recovered at the higher layer.

BRIEF DESCRIPTION OF THE DRAWINGS

A more detailed understanding of the invention may be had from the following description of a preferred embodiment, given by way of example and to be understood in conjunction with the accompanying drawings wherein.

DETAILED DESCRIPTION

When referred to hereafter, the terminology "WTRU" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "Node-B" includes but is not limited to a base station, a site controller, an access point (AP), or any other type of interfacing device capable of operating in a wireless environment.

The embodiments are applicable to any wireless communication systems including, but not limited to, third generation partnership project (3GPP) UMTS, LTE, high speed packet access (HSPA) enhancements (HSPA+), and the like.

Conventional HARQ transmission process is enhanced by early HARQ termination and limiting HARQ retransmissions. If there is a high probability that the retransmission of a packet will fail, it is advantageous to terminate the HARQ process, (i.e., discard the packet at the HARQ level), and recover the packet via a higher layer processing. For example, if the required transmit power exceeds a maximum allowed transmit power, the transmit power will be clipped to the maximum value. If the transmit power required for successful transmission of the packet is much higher than the maximum transmit power, there is a very high probability that the transmission will fail. In such situation, retransmission of the packet would simply waste resources causing more interference in the system (especially when transmitting at the maximum allowed power), and increase the packet transmission delay. In this situation, the HARQ process is terminated early even though the conventional HARQ termination condition, (e.g., maximum retransmission limit has not been reached), is not met.

Figure 1:
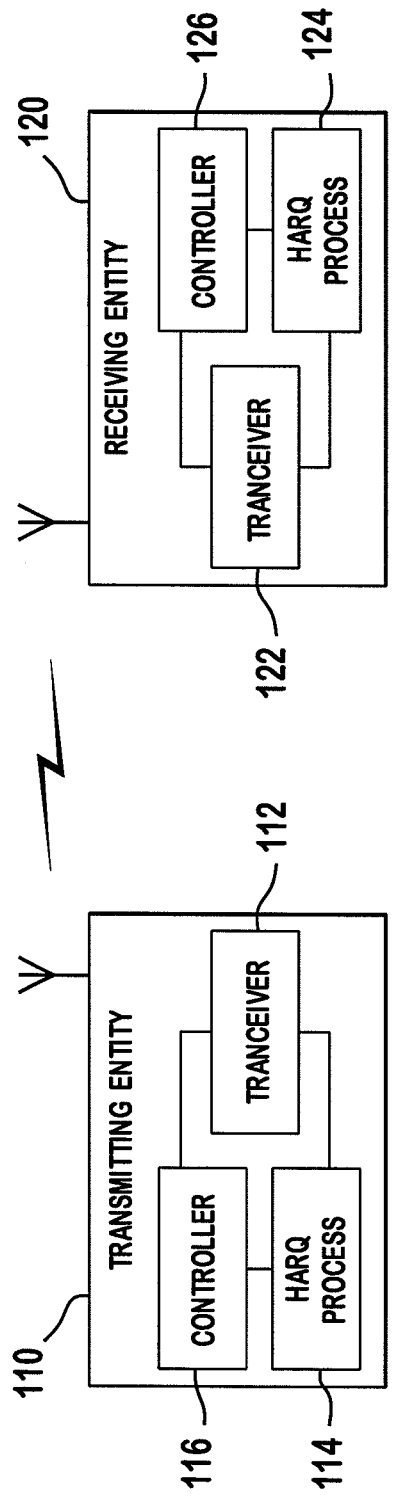
FIG. 1 shows a block diagram of an example transmitting entity and receiving entity.

FIG. 1 shows a block diagram of an example transmitting entity 110 and receiving entity 120. The transmitting entity 110 and the receiving entity 120 may be a WTRU and a Node-B, or vice versa. The transmitting entity 110 includes a transceiver 112, at least one HARQ process 114, and a controller 116. The transceiver 112 transmits a packet over a wireless channel. The HARQ process 114 transmits the packet implementing an HARQ mechanism. The controller 116 controls the HARQ process. The controller 116 determines whether an HARQ early termination condition for the packet has been met. If the HARQ early termination condition is met, the controller 116 terminates the HARQ process for the packet. The controller 116 may notify a higher layer (not shown in FIG. 1) of the HARQ early termination, (i.e., transmission failure of the packet).

The receiving entity 120 includes a transceiver 122, at least one HARQ process 124, and a controller 126. The transceiver 122 receives a packet transmitted by the transmitting entity 110 over a wireless channel. The HARQ process 124 sends an ACK or a NACK to the transmitting entity 110 based on decoding results of the received packet. The controller 126 controls the HARQ process 124. The controller 126 may set the HARQ early termination condition and send it to the transmitting entity 110. The controller 126 sets the HARQ early termination condition based on any information coming from any source, (e.g., TFC, TB size, transmit power, etc.). The controller 126 may be a packet scheduler and makes a decision to early terminate the HARQ process based on any criteria used for scheduling, (e.g., quality of service (QoS), delay, data available, or the like). For example, if a Node-B scheduler decides or indicates that another (new) packet needs to be transmitted by a WTRU, instead of retransmitting an old packet, it is indicated to the WTRU for early HARQ termination.

Figure 2:
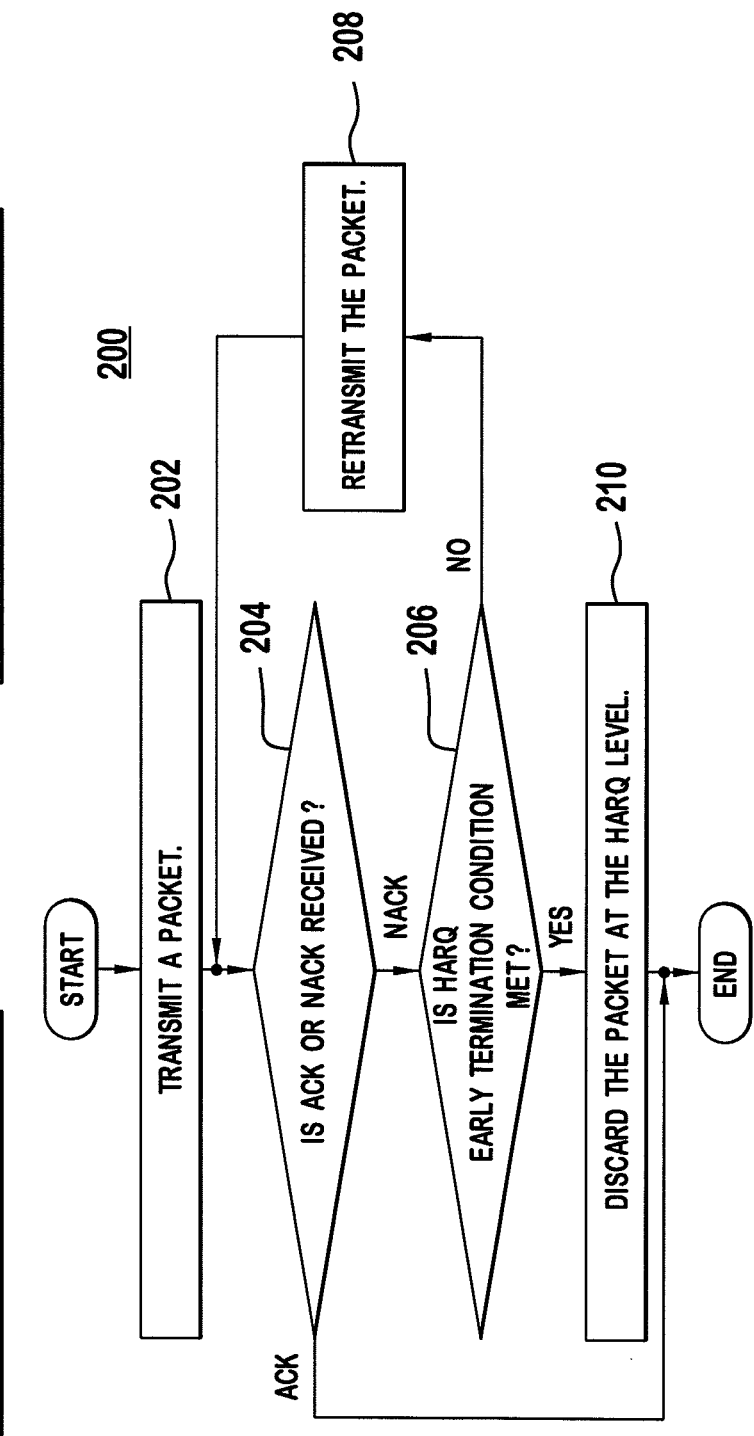
FIG. 2 is a flow diagram of an example process of transmitting a packet via an HARQ process.

FIG. 2 is a flow diagram of an example process 200 of transmitting a packet via an HARQ process. FIG. 2 shows only the steps for early HARQ termination and does not show steps of conventional HARQ termination for simplicity. It should be noted that the process 200 may be implemented with, or as part of, a conventional HARQ termination process. A transmitting entity 110 transmits a packet via an HARQ process (step 202). The transmitting entity 110 monitors whether an ACK or a NACK for the packet is received (step 204). If an ACK is received, the process 200 ends. If a NACK is received, the transmitting entity 110 determines whether an HARQ early termination condition is met (step 206). If the HARQ early termination condition is not met, the packet is retransmitted (step 208) and the process 200 returns to step 204. If the HARQ early termination condition is met, the packet is discarded at the HARQ level (step 210).

The HARQ early termination condition may be determined by the transmitting entity 110 or may be controlled by the receiving entity 120. If the early HARQ termination condition is controlled by the receiving entity 120, the receiving entity 120 may send a notice requesting an early termination of the HARQ process in a feedback channel, optionally with a NACK, and the controller 116 in the transmitting entity 110 terminates the HARQ process in response to the notice.

For example, if a Node-B decides to terminate the HARQ process of the WTRU early, the Node-B signals to the WTRU, (e.g., over a control channel), that the WTRU to stop sending, (i.e., stop retransmitting), the packet, (or equivalently, the Node-B signals that the WTRU should send a new packet, since this implies stopping of the old packet retransmission), on the HARQ process. The decision by the Node-B to early terminate the WTRU's HARQ process may be based on any information, (e.g., TFC, TB size, transmit power, or any other criteria employed by the Node-B scheduler for uplink traffic scheduling). Once the WTRU receives the signal that explicitly or implicitly indicates that the WTRU should early terminate the HARQ process, the UE terminates the HARQ process.

The HARQ early termination condition may be based on the number of retransmissions. For example, if after certain number of retransmissions an ACK is still not received, the controller 116 discards the packet and notifies a higher layer of the transmission failure. The limit may be changed dynamically as a function of at least one of the channel condition, the recent history of the number of retransmissions required for a successful transmission to and from a specific user or a specific HARQ process, measurements performed by the transmitting entity 110, measurements performed by the receiving entity 120 (which is provided to the transmitting entity 110 in a feedback channel), and the like. For example, under poor channel conditions the transmitting entity 110 may terminate the HARQ process earlier in order to use smaller block sizes and better channel coding and modulation scheme.

The limit may be set by the transmitting entity 110 or by the receiving entity 120. If the limit is set by the receiving entity 120, the receiving entity 120 may send the limit to the transmitting entity 110 via a feedback channel. Selection of the limit by the receiving entity 120 allows flexibility because the receiving entity 120 may have some information that is not available at the transmitting entity 110, allowing for better selection of the limit.

Alternatively, the HARQ early termination condition may be based on comparing the currently used transport format combination (TFC) with the optimal (or more up-to-date) TFC that is selected by TFC selection function for this transmission time interval (TTI). For example, if the transport block size selected by the TFC selection function is different, (i.e., either larger or smaller), than what the HARQ process is currently using, the HARQ process may be terminated early.

Alternatively, the HARQ early termination condition may be based on transmit power requirement. The transmit power required for successful transmission of the packet is compared with the maximum allowed transmit power. If the required transmit power is much higher than the maximum allowed transmit power, the controller 116 terminates the HARQ process and may notify a higher layer of the HARQ termination.

The HARQ early termination condition may be different for uplink and downlink transmissions. For example, in case of uplink transmissions, the maximum allowed transmit power and the power allowed by the network, (such as serving grant allocation in case of high speed uplink packet access (HSUPA) transmission), may be a factor in making the HARQ early termination decision. The transmit power required by the given transport block and the current total required transmit power (in the case where multiple channels are active in the uplink) may be compared with the maximum allowed transmit power and/or the serving grant. Based on this comparison, the transmitting entity 110 may determine if the retransmission of the transport block would most likely fail. In that case, the HARQ process is terminated early and the transport block is discarded at the HARQ level.

After early termination of an HARQ process, the controller 116 may notify a higher layer, (e.g., a medium access control (MAC) layer and/or a radio link control (RLC) layer), of the HARQ termination. The higher layer may then perform retransmission, (e.g., RLC ARQ). The higher layer may optimize transmission parameters by taking into account the fact that HARQ early termination has occurred.

Once the RLC layer decides to retransmit the packet and has re-submitted the packet to the MAC layer, the MAC layer, (e.g., a TFC selection entity), may select a new transport block size and all other relevant transmission parameters for the packet, (such as the modulation, coding, resource allocation, and the like). A new TFC may be selected for the retransmission. A more appropriate combination for the retransmission may be chosen. Additionally, a new HARQ process may be chosen if the HARQ profile of the previous HARQ process is not appropriate for the retransmission. Furthermore, based on the newly selected transport block size, the RLC layer may perform concatenation, segmentation or re-segmentation of the data that was contained in the early-terminated HARQ packet.

Although the features and elements are described in particular combinations, each feature or element may be used alone without the other features and elements or in various combinations with or without other features and elements. The methods or flow charts provided may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method for transmitting a packet via a hybrid automatic repeat request (HARQ) process, the method comprising:

transmitting the packet;

making a determination that a retransmission of the packet will fail based on a probability; and responsive to the determination that the retransmission of the packet will fail, terminating the HARQ process prior to a number of retransmissions of the packet reaching a maximum retransmission limit.

2. The method of claim 1, further comprising:

initiating, at a higher level than a HARQ level, a new HARQ process to transmit information associated with the packet using new transmission parameters; and transmitting the information in at least one new packet according to the new transmission parameters.

3. The method of claim 2, further comprising selecting the new transmission parameters to increase a likelihood of transmission success of the new packet relative to retransmission success of the packet associated with the terminated HARQ process.

4. The method of claim 1, wherein the determination that the retransmission of the packet will fail is based on a comparison of one or more operating parameters to one or more thresholds or references set based on the probability including whether: (1) a positive acknowledgement (ACK) has not been received prior to the number of retransmissions of the packet reaching a dynamically set limit that is equal to or less than the maximum retransmission limit, the dynamically set limit being set based on any of a channel condition, a recent history on the number of retransmissions required for a successful transmission, measurements performed by a transmitting entity, or measurements performed by a receiving entity; (2) a transmit power for successful transmission of the packet is a threshold amount higher than an actual transmit power for retransmission of the packet; (3) a transport format combination (TFC) selected for retransmission is different from an optimal TFC; or (4) a transport block (TB) size selected for retransmission is smaller than a sufficient TB size.

5. The method of claim 1, further comprising:
discarding the packet at a HARQ level prior to completion of the HARQ process;
notifying a higher layer that the HARQ process has been terminated prior to the completion of the HARQ process;
selecting, by the higher layer, new transmission parameters for retransmission of the packet; and
transmitting, by the higher layer via a new HARQ process, the packet after selecting the new parameters for retransmission of the packet.

6. The method of claim 5, wherein the transmitting of the packet via the new HARQ process includes reducing a block size associated with the packet to increase a likelihood of transmission success of the packet.

7. The method of claim 5, wherein the transmitting of the packet via the new HARQ process includes changing a coding scheme associated with the packet to increase a likelihood of transmission success of the packet.

8. The method of claim 1, wherein the terminating of the HARQ process includes discarding any stored data blocks of the HARQ process associated with the packet.

9. The method of claim 1, wherein the determination that the retransmission of the packet will fail is based on a comparison of an operating parameter to a threshold or a reference value set based on the probability.

10. An integrated circuit configured for packet transmission via a hybrid automatic repeat request (HARQ) process, the integrated circuit comprising:
a transceiver part configured to transmit a packet over a wireless channel; and
a processor part configured to make a determination that a retransmission of the packet will fail based on a probability, and responsive to the determination that the retransmission of the packet will fail, to terminate the HARQ process prior to a number of retransmissions of the packet reaching a maximum retransmission limit.

11. The integrated circuit of claim 10, wherein:
the processor part is configured to dynamically adjust a block size associated with the packet; and
the transceiver part is configured to transmit the packet with the dynamically adjusted block size to increase a likelihood of transmission success of the packet.

12. The integrated circuit of claim 10, wherein:
the processor part is configured to dynamically change a coding scheme associated with the packet; and
the transceiver part is configured to transmit the packet with the dynamically changed coding scheme to increase a likelihood of transmission success of the packet.

13. The integrated circuit of claim 10, wherein the processor part is configured to make the determination that the retransmission of the packet will fail based on a comparison of one or more operating parameters to one or more thresholds or references set based on the probability including whether: (1) a positive acknowledgement (ACK) has not been received prior to the number of retransmissions of the packet reaching a dynamically set limit that is equal to or less than the maximum retransmission limit, the dynamically set limit being set based on any of a channel condition, a recent history on the number of retransmissions required for a successful transmission, measurements performed by a transmitting entity, or measurements performed by a receiving entity; (2) a transmit power for successful transmission of the packet is a threshold amount higher than an actual transmit power for retransmission of the packet; (3) a transport format combination (TFC) selected for retransmission is different from an optimal TFC; or (4) a transport block (TB) size selected for retransmission is smaller than a sufficient TB size.

14. The integrated circuit of claim 10, wherein the processor part terminates the HARQ process by discarding any stored data blocks of the HARQ process associated with the packet.

15. The integrated circuit of claim 10, wherein the determination that the retransmission of the packet will fail is based on a comparison of an operating parameter to a threshold or a reference value set based on the probability.

16. Apparatus configured for packet transmission, comprising:
a transceiver configured to transmit a packet over a wireless channel via a hybrid automatic repeat request (HARQ) process;
a controller configured to determine that a retransmission of a packet will fail based on a probability; and
a HARQ mechanism configured to terminate the HARQ process prior to a number of retransmissions of the packet reaching a maximum retransmission limit, responsive to the determination that the retransmission of the packet will fail.

17. The apparatus of claim 16, wherein:
the controller is configured to dynamically adjust a block size associated with the packet; and
the transceiver is configured to transmit the packet with the dynamically adjusted block size to increase a likelihood of transmission success of the packet.

18. The apparatus of claim 16, wherein:
the controller is configured to dynamically change a coding scheme associated with the packet; and
the transceiver is configured to transmit the packet with the dynamically changed coding scheme to increase a likelihood of transmission success of the packet.

19. The apparatus of claim 16, wherein the HARQ mechanism terminates the HARQ process by discarding any stored data blocks of the HARQ process associated with the packet.

20. The apparatus of claim 16, wherein the determination that the retransmission of the packet will fail is based on a comparison of an operating parameter to a threshold or a reference value set based on the probability.

* * * * *